3,253,035
TRIS(p-N-MONOSUBSTITUTED AMINOPHENYL)-
AMINE COMPOUNDS
Norman K. Sundholm, Middlebury, Conn., assignor to
United States Rubber Company, New York, N.Y., a
corporation of New Jersey
No Drawing. Filed May 28, 1962, Ser. No. 197,907
5 Claims. (Cl. 260—576)

This invention relates to new antiozonants for rubber and to their use in inhibiting the deteriorating effect of ozone on rubber vulcanizates.

There are two types of surface cracking effects with vulcanized rubber products brought about by atmospheric weathering. These have been described in papers by R. G. Newton published in the Journal of Rubber Research, 14, No. 3, 27 and No. 4, 41 (1945), and by James Crabtree and A. R. Kemp published in Industrial and Engineering Chemistry, 38, 278 (1946).

One is due to light-catalyzed oxidation of the rubber molecules at the surface to produce a hard, shiny, inelastic skin which under the influence of temperature changes, rain or flexing develops a disorderly arrangement of cracks, which generally has been denoted by the term "crazing."

The other surface cracking is caused by ozone and occurs when the rubber is under strain. The cracks formed are oriented perpendicular to the direction of strain. At low elongations, which generally are in the 2 to 20% range depending on the rubber stock, temperature, etc., the cracks will be few but deep and disruptive. As the elongation increases the cracks become more frequent but less deep. The influences of temperature, type of rubber, type of filler, humidity, time, concentration of ozone, flexing, state of cure, etc., on ozone cracking has been well studied.

It is of interest to point out that the skin formed by light-catalyzed oxidation acts as a protectant to ozone attack as long as it remains unbroken. This principle has been made use of in the utilization of waxes as antiozonants. Waxes are milled into the rubber stock before vulcanization; the wax migrates to the surface of the rubber article during storage and service to form a film which acts as a physical barrier to the diffusion of ozone to the rubber surface. This is effective for rubber articles which are not dynamically flexed during service, but worse than no wax for flexed articles since the wax film is not sufficiently elastic to prevent the formation of at least a few breaks in it. Ozone attack at these few points results in the fast growth of deep, disruptive fissures which seriously shorten the serviceable life of the article.

Chemical antiozonants have been developed which retard the formation of ozone cracks during both static and dynamic conditions. Examples of antiozonants now being used are N-isopropyl-N'-phenyl-p-phenylenediamine, N - cyclohexyl-N'-phenyl - p - phenylenediamine, N,N'-dioctyl-p-phenylenediamine, 6-ethoxy-1,2-dihydro-2,2,4-trimethylquinoline and nickel dibutyldithiocarbamate.

I have discovered a new class of antiozonants. These are tris(p-N,N-dialkylaminophenyl)amines in which the alkyl radicals are the same and have 1 to 2 carbon atoms, tris(p-N-sec-alkylaminophenyl)amines in which the secondary alkyl radical has 3 to 6 carbon atoms, and tris(p-N-cycloalkylaminophenyl)amines in which the cycloalkyl radical has 5 to 6 carbon atoms. Such tris(p-N-monosubstituted aminophenyl)amines are new chemicals and may be represented by the structure:

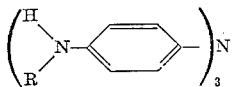

where R represents a secondary alkyl radical having 3 to 6 carbon atoms or a cycloalkyl radical having 5 to 6 carbon atoms. Examples of such secondary alkyl radicals are: isopropyl, sec-butyl, 2-pentyl, and 2-hexyl. The antiozonants of the present invention are used in amounts from 0.1 to 5 parts by weight per 100 parts of rubber.

The tris(p-N,N-dialkylaminophenyl)amines are prepared by the reductive alkylation of the known tris(p-aminophenyl)amine with the corresponding aldehyde in the presence of hydrogen and a palladium on carbon catalyst. The tris(p-N-monosubstituted aminophenyl)amines are prepared by the reductive alkylation of the known tris(p-aminophenyl)amine or tris(p-nitrophenyl)amine with the corresponding ketone in the presence of hydrogen and a palladium on carbon catalyst. The known tris(p-aminophenyl)amine and tris(p-nitrophenyl)amine may be made as decribed by C. Heydrich in Berichte, 18, 2156 (1885). R. I. Walter in Jour. Am. Chem. Soc., 75, 2771 (1953) also describes the preparation of the tris(p-nitrophenyl)amine.

The following illustrates the preparation of the chemicals of the present invention:

*Preparation of tris(p-N,N-dimethylaminophenyl)amine*

Into a 1-liter rocking autoclave were charged 10.0 grams of tris(p-aminophenyl)amine, 7.5 grams of 91 percent paraformaldehyde, 200 ml. of methanol and 1.1 grams of 5% palladium on carbon. The contents while agitated were subjected to 300–340 p.s.i. of hydrogen at 120° C. until the absorption of hydrogen stopped at approximately the calculated amount; this required about 1½ hours. The hydrogenated charge was removed from the autoclave and sufficient methanol added so that, when boiling, all of the crystalline product had dissolved. The hot solution was filtered to remove the catalyst. The green crystals which separated were crystallized twice from methanol to give 6.0 grams of pale green-yellow plates melting at 158–159° C.

Tris(p-N,N-diethylaminophenyl)amine may be made in a similar manner using acetaldehyde instead of paraformaldehyde.

*Preparation of tris(p-N-isopropylaminophenyl)amine*

Into a 1-liter rocking autoclave were charged 11.0 grams of tris(p-aminophenyl)amine, 150 ml. of acetone and 0.8 gram of 5% palladium on carbon. The contents while agitated were subjected to 300–500 p.s.i. of hydrogen at 145–165° C. for 20 minutes. The hydrogenated charge was filtered to remove the catalyst and the filtrate evaporated under reduced pressure to leave a purple pasty solid. It was recrystallized from ethanol to give 5.0 grams of pale green-yellow crystals melting at 148–149° C.

*Analysis.*—Calculated for $C_{27}H_{36}N_4$: C, 77.88; H, 8.65; N, 13.46. Found: C, 77.81; H, 8.99; N, 13.18.

This compound was also prepared by subjecting a charge consisting of 40.0 grams of tris(p-nitrophenyl)amine, 550 ml. of acetone and 3.0 grams of 5% palladium on carbon to 100–300 p.s.i. of hydrogen at 50–160° C. for 1½ hours and to 300–470 p.s.i. of hydrogen at 160° C. for 1¾ hours. The hydrogenated charge was worked up similarly to the above.

Tris(p-N-sec-butylaminophenyl)amine, tris(p-N - 2-pentylaminophenyl)amine and tris(p-N-2 - hexylaminophenyl)amine may be made in similar manner using methyl ethyl ketone, 2-pentanone and 2-hexanone, respectively, instead of acetone.

*Preparation of tris(p-N-cyclohexylaminophenyl)amine*

Into a 1-liter rocking autoclave were charged 45.0 grams of tris(p-aminophenyl)amine, 250 ml. of cyclohexanone and 1.5 grams of 5% palladium on carbon. The contents while agitated were subjected to 200–400 p.s.i. of hydrogen at 110–115° C. for 1 hour. The hydrogenated charge was filtered to remove the catalyst and the filtrate evaporated under reduced pressure with gentle warming to leave a tan-green solid. It was digested with ethanol and then recrystallized from isopropanol with decolorizing charcoal treatment to give pale green-yellow crystals melting at 182–183° C.

*Analysis.*—Calculated for $C_{36}H_{48}N_4$: C, 80.60; H, 8.95; N, 10.45. Found: C, 80.87; H, 9.31; N, 10.35.

The chemicals of the present invention are antiozonants for rubbers, such as natural rubber and synthetic rubbers, and mixtures thereof. The synthetic rubbers may be the products of aqueous emulsion polymerizations with a peroxide catalyst of various rubber-forming monomers. Such synthetic rubbers may be polymers of butadienes-1,3, e.g. butadiene-1,3, 2-methylbutadiene-1,3 (isoprene), 2-chlorobutadiene-1,3 (chloroprene), 2,3-dimethylbutadiene-1,3, piperylene, and copolymers of mixtures thereof, and copolymers of mixtures of one or more such butadienes-1,3 with up to 70% of such mixtures of one or more monoethylenic compounds which contain a $CH_2=C<$ group where at least one of the disconnected valences is attached to an electro-negative group, that is a group which substantially increases the electrical dissymmetry or polar character of the molecule. Examples of such monoethylenic compounds which are copolymerizable with butadienes-1,3, are aryl olefins, such as styrene, vinyl naphthalene, alpha methyl styrene, para chloro styrene, dichloro styrene, alpha methyl dichloro styrene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride; vinyl pyridines, such as 2-vinyl pyridine, 2-methyl-5-vinyl pyridine; vinyl carbazole. Commercial synthetic rubbers of this type are SBR (copolymer of a major proportion of butadiene and a minor proportion of styrene) and NBR (copolymer of a major proportion of butadiene and a minor proportion of acrylonitrile). The synthetic rubber may also be a 1,4-polybutadiene or a 1,4-polyisoprene, prepared by solution polymerization. Such 1,4-polybutadiene may be made by solution polymerization of butadiene-1,3 in the presence of a catalyst reaction product of an aluminum trialkyl, such as aluminum triethyl, and titanium iodide. Such 1,4-polyisoprene may be made by solution polymerization of isoprene in the presence of a catalyst reaction product of an aluminum trialkyl, such as aluminum triisobutyl, and titanium tetrachloride. The synthetic rubber may also be the product of the solution polymerization of a mixture of a major proportion of isoolefin and a minor proportion of conjugated diene at low temperature in the presence of a Friedel-Crafts polymerization catalyst of the type of aluminum chloride or boron trifluoride. An example of a commercial synthetic rubber of this type is butyl rubber which is a copolymer of about 95 to 99 parts of isobutylene and correspondingly 5 to 1 parts of isoprene. The synthetic rubber may also be the product of the solution polymerization of a mixture of ethylene and at least one alpha olefin having the formula $CH_2=CHR$ in which R is an alkyl radical having 1 to 8 carbon atoms, e.g. propylene, with, if desired, a minor proportion of a non-conjugated diene, such as 1,4-hexadiene or dicyclopentadiene, in the presence of a catalyst reaction product of aluminum trialkyl, and titanium tetrahalide or vanadium tetrahalide or vanadium oxytrihalide, e.g. the reaction product of aluminum tridecyl and vanadium oxytrichloride. An example of a synthetic rubber of this type is a terpolymer of about 55% propylene, 41% ethylene and 4% 1,4-hexadiene.

The new antiozonants may be used in combination with waxes and other antiozonants. They may be used in rubber stocks with the usual compounding ingredients, e.g., vlucanizing agents, accelerators, activators, retarders, antioxidants, softeners, and reinforcing agents.

The compounds of the present invention were evaluated for their antiozone activity by various tests described below. The SRB1022 in the first test and the SRB1500 in the second and third tests are copolymers of about 77 parts of butadiene-1,3 and 23 parts of styrene.

In the test of Delman, Simms and Allison described in Analytical Chemistry, 26, 1589 (1954), the ability of the compounds to retard the scission of rubber molecules in solution by ozone is determined by measuring the percent of initial viscosity of the rubber solution retained after successive periods of subjection to a regulated stream of ozone of constant concentration. It has been well demonstrated that there is a correlation between the results of this test and actual rubber tests taking into account such factors as the reactivity of the test compound with the other rubber compounding ingredients, volatility, etc. In the test by which the compounds of this invention were evaluated, solutions of 1.25 grams of extracted SBR1022 and 0.125 gram of test compound, and a solution of 1.25 grams of the same rubber without any test compound, in 250 ml. of o-dichlorobenzene were ozonized at room temperature with a stream of air containing 250 p.p.m. of ozone by volume at a rate of 0.02 cubic meter per hour. The measurements of the viscosity of the solutions at 30° C. were made before the start of the ozonization and after each hour for six hours and from these data the percent of initial viscosity retained after each hour calculated. The results are given in the following table:

| Test Compound | Percent of Initial Viscosity Retained After— | | | | | |
|---|---|---|---|---|---|---|
| | 1 hr. | 2 hr. | 3 hr. | 4 hr. | 5 hr. | 6 hr. |
| Tris(p-N,N-dimethylaminophenyl)amine | 93.8 | 85.9 | 75.0 | 65.1 | 50.0 | 32.8 |
| Tris(p-N-isopropylaminophenyl)amine | 95.0 | 86.2 | 71.3 | 50.3 | 26.5 | 13.3 |
| Tris(p-N-cyclohexylaminophenyl)amine | 93.9 | 86.9 | 70.2 | 49.5 | 29.3 | 16.2 |
| None | 35.5 | 15.2 | | | | |

The data in the above table show the high antiozone activity of the antiozonants of the present invention in this test.

In the next two tests showing the ability of the chemicals of the present invention to retard the formation of ozone cracks in vulcanized rubber, rubber stocks of the following formulation were used, the antiozonants of the present invention being incorporated on a mill along with the sulfur in a master batch of the rubber and other compounding ingredients prepared in a Banbury mixer.

| | Parts by weight |
|---|---|
| SRB1500 | 100.0 |
| Zinc oxide | 3.0 |
| HAF black | 40.0 |
| EPC black | 10.0 |
| Stearic acid | 1.5 |
| Saturated polymerized petroleum hydrocarbon (Para-Flux 2016) | 3.5 |
| Naphthenic type oil (Circo Light Process Aid) | 3.5 |
| Sulfur | 2.0 |
| N-cyclohexyl-2-benzothiazole-sulfenamide | 1.25 |
| Antiozone test chemical | 2.0 |

In the second test looped specimens of the stocks vulcanized for 45 minutes at 292° F. were prepared according to Procedure B (Exposure of Looped Specimens) of ASTM Method D518–57T (Resistance to Surface Cracking of Stretched Rubber Compounds). Specimens were subjected to outdoor exposure on a roof at an angle of 45 degrees facing south and to 50 parts per hundred million by volume of ozone in an ozone box at 40° C. The specimens were observed after appropriate intervals and the time recorded to the appearance of cracks corresponding to those having a rating number of 3 in ASTM Method D1171–59 (Test for Weather Resistance Exposure of Automotive Rubber Compounds). The results are given in the following table:

| Test Compound | Time Required to Crack to a Rating No. of 3 | |
|---|---|---|
| | Outdoor Exposure, days | Ozone Box Exposure, hours |
| Tris(p-N,N-dimethylaminophenyl)amine | 42 | 96 |
| Tris(p-N-isopropylaminophenyl)amine | (a) | (b) |
| Tris(p-N-cyclohexylaminophenyl)amine | 169 | 120 |
| None | 7 | 64 | a No visible cracking after 295 days.
b No visible cracking after 1272 hours.

In the third test molded stocks ½" x 6" x ¼" having a ⅛" radius circular groove across the center were vulcanized for 45 minutes at 292° F. They were mounted outdoors facing south and flexed through a 78 degree angle at about 8.5 kilocycles per hour. Observations were made after appropriate intervals and the number of kilocycles recorded to the appearance of cracks corresponding to those having a rating number of 3 in ASTM Method D1171–59. The results are given in the following table:

Test compound: Kilocycles required to crack to a rating No. of 3
Tris(p-N,N-dimethylaminophenyl)amine ---- 7089
Tris(p-N-isopropylaminophenyl)amine ----- 7089
Tris(p-N-cyclohexylaminophenyl)amine ---- 3868
None ------------------------------------ 2581

These data show the effectiveness of the new antiozonants in vulcanized rubber stocks.

In view of the many changes and modifications that may be made without departing from the principles underlying the invention, reference should be made to the appended claims for an understanding of the scope of the protection afforded the invention.

Having thus described my invention, what I desire to protect by Letters Patent is:

1. A tris(p-N-monosubstituted aminophenyl)amine in which the substituent is selected from the group consisting of secondary alkyl radicals having 3 to 6 carbon atoms and cycloalkyl radicals having 5 to 6 carbon atoms.
2. A tris(p-N-sec-alkylaminophenyl)amine in which the secondary alkyl radical has 3 to 6 carbon atoms.
3. Tris(p-N-isopropylaminophenyl)amine.
4. A tris(p-N-cycloalkylaminophenyl)amine in which the cycloalkyl radical has 5 to 6 carbon atoms.
5. Tris(p-N-cyclohexylaminophenyl)amine.

References Cited by the Examiner

UNITED STATES PATENTS 2,558,285  6/1951  Wilson _____ 260—576
2,573,608  10/1951 Rieveschl _____ 260—576
2,943,109  6/1960  Ramsay _____ 260—577
3,019,211  1/1962  Albert _____ 260—45.9
3,035,014  5/1962  Popoff et al. _____ 260—45.9

OTHER REFERENCES

Neunhoeffer et al., "Deutsche Chemische Gesellschaft Berichte," 1959, vol. 92, pp. 245–251.

CHARLES B. PARKER, *Primary Examiner.*

DALE R. MAHANAND, *Assistant Examiner.*